United States Patent
Watanabe et al.

(12) 
(10) Patent No.: US 6,765,752 B2
(45) Date of Patent: Jul. 20, 2004

(54) DISK DEVICE

(75) Inventors: Masashi Watanabe, Shuso-gun (JP); Tetsuya Takashima, Toyo (JP)

(73) Assignee: Matsushita Electric Industrial Co., Ltd. (JP)

( * ) Notice: Subject to any disclaimer, the term of this patent is extended or adjusted under 35 U.S.C. 154(b) by 79 days.

(21) Appl. No.: 10/048,583

(22) PCT Filed: Jun. 11, 2001

(86) PCT No.: PCT/JP01/04927
§ 371 (c)(1),
(2), (4) Date: Feb. 1, 2002

(87) PCT Pub. No.: WO01/99111
PCT Pub. Date: Dec. 27, 2001

(65) Prior Publication Data
US 2003/0011926 A1 Jan. 16, 2003

(30) Foreign Application Priority Data
Jun. 22, 2000 (JP) ........................................ 2000-187034

(51) Int. Cl.$^7$ .............................................. G11B 17/02
(52) U.S. Cl. ................................................... 360/97.01
(58) Field of Search .......................... 360/97.01, 97.02, 360/97.03, 98.01, 98.07, 98.08, 99.01, 99.08, 99.12

(56) References Cited

U.S. PATENT DOCUMENTS 5,768,049 A * 6/1998 Morehouse et al. ..... 360/97.01
6,069,766 A * 5/2000 Battu et al. .............. 360/97.01

* cited by examiner

Primary Examiner—Robert S. Tupper
(74) Attorney, Agent, or Firm—Parkhurst & Wendel, L.L.P.

(57) ABSTRACT

A disk device such as a magnetic hard disk drive. A disk is arranged inside a frame body. A cover is placed on the frame body, a gap is formed between a rim of the cover and the frame, and this gap is shielded by a sheet having an adhesive portion.

4 Claims, 11 Drawing Sheets

DISK DEVICE

TECHNICAL FIELD

The present invention relates to a disk device such as a magnetic hard disk drive and the like.

BACKGROUND ART

Conventionally, as one type of hard magnetic disk devices, a magnetic hard disk drive which conforms to the Personal Computer Memory Card International Association (PCMCIA) "Type II standards" is known. This hard magnetic disk device comprises a mechanism part where a movable part exists and an electric circuit part for controlling this mechanism part. The mechanism part forms a shielded space and the electric circuit part is arranged outside this shielded space.

In the mechanism part, an actuator as the movable part is provided inside a frame body. This actuator causes a magnetic head for recording and reproducing information to shift with respect to a magnetic disk on and from which information is recorded and reproduced. The frame body is covered by a top cover. This top cover has an adhesive portion on the peripheral portion thereof, is adhered to the frame body by this adhesive portion, and shields the interior space thereof.

However, the following problems exist in such well-known devices.

Due to nonconformity in components and/or assembly, some devices need to be repaired after assembly before being placed on the market. However, the sealing structure of the device is constructed by, as mentioned above, adhering the top cover having the adhesive portion to the frame body, and when the top cover is opened for repairing the device, deformation occurs to the top cover, and the top cover cannot be reused. In this case, since the top cover is not low-priced, there is a problem such that the price of the device is raised.

The electric circuit part is assembled by means of a printed circuit board (hereinafter, referred to as a "PCB"). In the device, in order to cause an actuator to generate sufficient torque, a magnetic circuit for driving this actuator is thickly formed. In addition, the PCB is constructed while avoiding these thick components.

On the other hand, in recent years, a method (a ramp loading method) has been employed, wherein a magnetic head is evacuated to the outside of a magnetic disk during the non-operating time of a device. In the ramp loading method, since the magnetic head is evacuated to the outside of the magnetic disk, the rotation angle of the actuator increases. Then, inevitably, components forming the magnetic circuit become large.

Therefore, if the ramp loading method is employed in the well-known device, it is necessary to cut away the PCB greatly. As a result, the area for mounting electronic components decreases and a problem occurs such that these electronic components cannot be mounted or connection of an electric circuit becomes impossible. Meanwhile, if the mounting area of the PCB is secured, a problem occurs such that the ramp loading method cannot be employed or a voice coil motor becomes thin and it becomes impossible to cause the actuator to generate sufficient torque.

DISCLOSURE OF INVENTION

The present invention is made to solve such problems in the prior art, and it is an object of the invention to construct a disk device such as a magnetic hard disk drive at a low price, and in a low-profile device as well, to efficiently arrange a mechanism portion and an electric circuit portion so as to enable an actuator to generate sufficient torque.

In order to achieve this object, in a disk device with a disk arranged inside a frame body according to the present invention, a cover is placed on the frame body, a gap is formed between a rim of the cover and the frame body, and the gap is shielded by a sheet having an adhesive portion.

According to the present invention, in compliance with the PCMCIA Type II standards, a magnetic hard disk is formed such that a peripheral portion thereof is thinner in thickness than a central portion thereof, and includes an interface connector at an end portion thereof, wherein a printed circuit board is provided in the thick central portion of the disk, and the interface connector is provided formed with horn-shaped connecting portions to the printed circuit board. The horn-shaped connecting portions are formed in a protruded manner so as to reach the thick central portion.

In a disk device with a disk arranged inside a frame body according to the present invention, the peripheral portion is formed to be thinner than the central portion, a printed circuit board is provided in the thick central portion, and a surface of the printed circuit board for mounting electric components on the printed circuit board is a surface on the frame body side.

In addition, the disk device with a disk arranged inside a frame body according to the present invention comprises an actuator provided for driving a head for recording and reproducing information on and from the disk, which actuator is composed of a voice coil motor comprising a pair of yokes opposed to each other with a predetermined distance therebetween, a movable coil wound to be movable between the yokes, and a permanent magnet attached to at least one of the yokes to add a magnetic field to the movable coil. Further, one of the yokes forms a part of an outer wall of the frame body, in place of the frame body.

In a disk device with a disk arranged inside a frame body according to the present invention, an actuator is provided for driving a head for recording and reproducing information on and from the disk, the actuator being composed of a voice coil motor comprising a pair of yokes opposed to each other with a predetermined distance therebetween, a coil wound to be movable between the yokes, and a permanent magnet attached to at least one of the yokes to add a magnetic field to the movable coil, and each or the yoke is formed to be thick at a part corresponding to a section between two poles of the permanent magnet and a vicinity thereof, and is formed, at the other part, to be thinner than the thick part.

Thus, according to the present invention, even in the low-profile disk device, by efficiently arranging the mechanism portion and the electric circuit portion, the actuator can be caused to generate sufficient torque.

In detail, according to the disk device of the present invention, the gap is formed between the rim of the cover and the frame body, and this gap is closed by means of the sheet having the adhesive portion. Therefore, when repairing the device, it is sufficient to replace only the inexpensive sheet having an adhesive portion.

According to the present invention, by forming a hole on the sheet, component members of the disk device such as mechanical components and the like can be arranged in this hole. With such a structure, the component members of the disk device such as mechanical components can be provided to a large extent and performance of the device can be enhanced.

In the magnetic hard disk drive of the present invention, horn-shaped connecting portions to the PCB, which have been formed in a protruded manner so as to reach the thick central portion of the disk device, are formed on the interface connector, so that the PCB can be disposed on the lower side than a part having a thickness of 3.3 mm. As a result, on the PCB with the IC-mounting surface being on the frame body side, component members of the disk device such as mechanism components can be arranged between the ICs. Furthermore, even when a ramp loading method is employed, which has been employed in recent years for improvement in impact resistance of the device, achievement of lower power consumption and higher recording density, the voice coil motor can be made thick without reducing the mounting area of the PCB and the actuator can be caused to generate sufficient torque.

According to the present invention, since the connecting part between the interface connector and the PCB is low in rigidity, connecting portions are provided for fixing this interface connector to the frame body with screws. As a result, even if an impact is applied to the interface connector, the electrical connecting part of the interface connector can be prevented from being detached.

According to the disk device of the present invention, the hole in which the permanent magnet is placed is made on the frame body and also the yoke is provided in place of the wall part of this frame body. Thus, the magnetic circuit portion can be made thick and torque generated in the actuator can be increased.

According to the present invention, bosses having screwing margins are provided inside the frame body and the yoke is constructed so as to be fixed by screws to the frame body from the rear side of the frame body. As a result, without reducing the IC-mounting area of the PCB, the yoke can be screwed. This screw tightening allows it to replace the yoke alone.

The disk device of the present invention can be provided with concave portions for embedding screw heads in the yoke. As a result, since the screw heads do not project, ICs can be mounted on the PCB at a position corresponding to the concave portions.

The present invention enables it to thinly form other parts of the yoke than the vicinity of a part corresponding to the central part of the permanent magnet. Therefore, ICs can be mounted on the PCB at a position corresponding thereto. As a result, without reducing the IC-mounting area, the actuator can be caused to generate great torque.

According to the disk device of the present invention, the interior of the device can be shielded by closing the gap between the lower yoke and the frame body by means of the sheet having the adhesive portion. This sheet has a hole in the central part. The thick part of the yoke is inserted into this hole. As a result, while employing the shielding structure, without reducing the IC-mounting area, the actuator can be caused to generate great torque.

BEST MODE FOR CARRYING OUT THE INVENTION (Description of a Prior Art)

Before describing an embodiment of the present invention, for the purpose of reference, a description will be given of an example of the well-known magnetic hard disk drive in compliance with the PCMCIA Type II standards by means of FIG. 10 through FIG. 15.

Figure 15:
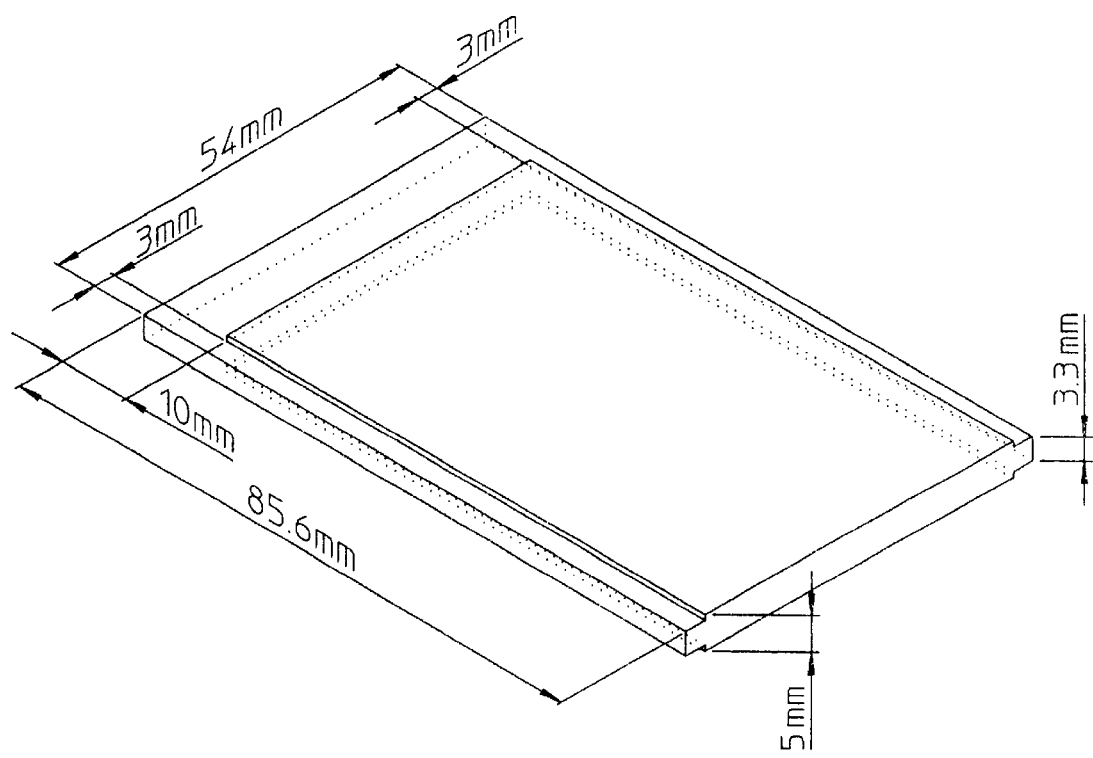
FIG. 15 is a view showing a size of the device according to PCMCIA Type II standards.

Referring to FIG. 15, the outline dimensions of a device based on the PCMCIA Type II standards are set such that, as illustrated, the peripheral portion is thinner than the central portion. In addition, the device is constructed so that an interface connector is provided on a portion having a thickness of 3.3 mm and a length of 10 mm of the end portion thereof. This magnetic hard disk drive shown in FIG. 15 comprises a mechanism part where movable members exist and an electric circuit part for controlling this mechanism part. The mechanism part forms a shielded space and the electric circuit portion is arranged outside this shielded space.

Referring to FIG. 10 through FIG. 14, 1 denotes a magnetic disk on and from which information is recorded and reproduced and this magnetic disk 1 is attached to a spindle motor 3 by a clamp 2. The spindle motor 3 is attached to a frame body 4. 5 denotes an actuator and on this actuator 5, a magnetic head 6 which carries out recording and reproduction of information and a coil 7 are mounted. This actuator 5 is rotatably supported on the frame body 4 via a ball bearing 8 provided on this actuator 5. 9 denotes a permanent magnet, 10 denotes an upper yoke, and 11 denotes a lower yoke. A magnetic circuit is constructed by the permanent magnet 9, the upper yoke 10, and the lower yoke 11, and a voice coil motor is constructed by this magnetic circuit and the coil 7 provided on the actuator 5. The lower yoke 11 is glued to the frame body 4. The permanent magnet 9 is glued to the upper yoke 10 and the upper yoke 10 is attached to the frame body 4 by a force of the permanent magnet 9 to attract the lower yoke 11. 13 denotes a top cover including an adhesive portion 12 on the peripheral portion thereof, and is adhered on the frame body 4 by this adhesive portion 12, thereby shielding the interior thereof.

In such a well-known magnetic hard disk drive, when the device is not operating, the magnetic head 6 is located at a position where no information has been recorded on the inner circumferential side of the magnetic disk 1. When the device starts, the magnetic disk 1 attached to the spindle motor 3 rotates, and the magnetic head 6 is floated over the magnetic disk 1 by wind power generated by the rotating magnetic disk 1. Then, the magnetic head 6 lands when the device stops. This is referred to as a contact start/stop mode. When the device is operating, the actuator 5 shifts, due to actions of the voice coil motor, in an information recording/ reproducing region on the disk and carries out recording and reproduction. The floating amount of the magnetic head 6 is several tens nanometers and if foreign matter invades this gap, the magnetic disk 1 is damaged and information which has been recorded on the magnetic disk 1 is lost. For prevention thereof, components inside the device are cleanly washed and the device is assembled in a clean room. Furthermore, in order to maintain cleanliness inside the device, the device has a shielding structure. The magnetic disk 1, the clamp 2, the spindle motor 3, the actuator 5, the permanent magnet 9, the upper yoke 10, and the lower yoke 11 are arranged in the shielding structure.

14 denotes a PCB including ICs 15 for controlling recording and reproduction of information and positioning of the actuator 5, an interface connector 16 for inputting thereinto or outputting therefrom information with a computer or the like. In addition, the PCB 14 is further provided with a resistance, a capacitor and the like, thereby forming an electric circuit. In addition, the PCB 14 has a cutaway shape so as to avoid the spindle motor 3, the magnetic head 6, the actuator 5, and the yokes 10 and 11. The interface connector 16 is, according to the standards, located on a part having a length of 10 mm and a thickness of 3.3 mm of one end of the device, and the PCB 14 is arranged on a part having a thickness of 5 mm. Of the ICs 15, the small ICs are arranged on the frame body side surface of the PCB 14 and the large ICs are arranged on the surface opposite to the frame body 4. This PCB 14 is arranged outside the shielded space and is, as illustrated, covered by a bottom cover 17.

However, the following problems exist in such well-known devices.

Due to nonconformity in components and/or assembly, some devices need to be repaired after assembly before being placed on the market. However, the sealing structure of the device is constructed by, as mentioned above, adhering the top cover 12 having the adhesive portion 12 to the frame body 4, and when the top cover 13 is opened for repair of the device, deformation occurs to the top cover 13, and the top cover 13 cannot be reused. In this case, since the top cover 13 is not low-priced, there is a problem such that the price of the device is raised.

In addition, since the device has a low profile, screwing margins cannot be provided on the lower surface of the frame body. Therefore, the lower yoke 11 is fixed on the frame body 4 not by screws but by glue. In this case, when replacement of the lower yoke 11 becomes necessary, replacement of the lower yoke 11 alone cannot be performed and it is also necessary to replace the frame body 4 and the spindle motor 3 as well. Since the frame body 4 and the spindle motor 3 are not low-priced, there is a problem such that the price of the device is raised.

In the device, in order to cause the actuator 5 to generate sufficient torque, the magnetic circuit is thickly formed. In addition, the PCB 14 is constructed while avoiding these thick components. On the other hand, impact resistance, higher recording density of information, and lower power consumption are demanded in the device. In order to satisfy these performance characteristics, in recent years, a method (a ramp loading method) has been employed, wherein a magnetic head is evacuated to the outside of a magnetic disk during the non-operating time of a device. According to this method, by evacuating the magnetic head from above the magnetic disk, the magnetic disk is prevented from being damaged by the magnetic head and impact resistance is improved. Furthermore, since the magnetic head is not in contact with the magnetic disk, adsorption does not occur. As a result, it is unnecessary to provide coarse surface roughness, which is referred to as texture, the floating amount of the magnetic head can be reduced and realizing high capacity recording information becomes possible. In addition, when starting the device, since a load of the magnetic head is not exerted to the spindle motor, power consumption can be reduced. However, in the ramp loading method, since the magnetic head is evacuated to the outside the magnetic disk, a feature exists such that the rotation angle of the actuator increases. If the rotation angle increases, the coil, permanent magnet, and yokes become inevitably large.

Therefore, if the ramp loading method is employed in the well-known device, it is necessary to cut away the PCB 14 greatly. As a result, the area for mounting the ICs 15 decreases and a problem occurs such that these ICs 15 cannot be mounted or connection of an electric circuit becomes impossible. Meanwhile, if the mounting area of the PCB 14 is secured, a problem occurs such that the ramp loading method cannot be employed or a voice coil motor becomes thin and it becomes impossible to cause the actuator 5 to generate sufficient torque.

(Description of an Embodiment of the Present Invention)

In the present invention, such problems of the prior art have been solved and in the following, an embodiment thereof will be described.

In the magnetic hard disk drive as shown in FIG. 1 through FIG. 7, a mechanism part where a movable part exists and an electric circuit part for controlling this mechanism part are provided. The mechanism part forms a shielded space and the electric circuit part is arranged outside the shielded space.

Referring to these drawings, 21 denotes a magnetic disk on and from which information is recorded and reproduced, and this magnetic disk 21 is attached to a spindle motor 23 by a clamp 22. The spindle motor 23 is attached to a frame body 24. 25 denotes an actuator on which a magnetic head 26 which carries out recording and reproduction of information and a coil 27 are mounted. The actuator 25 is provided with a ball bearing 28 and the actuator 25 is rotatably attached to the frame body 24 via this ball bearing 28. 29 denotes a permanent magnet, 30 denotes an upper yoke, and 31 denotes a lower yoke. The permanent magnet 29 is glued to the lower yoke 31, and the lower yoke 31 is attached to the frame body 24 by screws, which will be described later. The upper yoke 30 is attached to the frame body 24 by a force being attracted by the permanent magnet 29. A magnetic circuit is constructed by the permanent magnet 29, the upper yoke 30, and the lower yoke 31, and a voice coil motor is constructed by this magnetic circuit and the coil 27 provided on the actuator 25. 38 denotes a ramp, onto which the magnetic head 26 is evacuated when the device does not operate.

33 denotes a top cover and this is attached to the frame body 24 by screws (not shown). 39 denotes a top sheet having an adhesive portion 32 and this top sheet 39 closes the gap between the frame body 24 and the top cover 33, thereby shielding the interior of the device. 40 denotes a bottom sheet having an adhesive portion and this closes the gap between the frame body 24 and the lower yoke 31 and shields the interior of the device. The magnetic disk 21, the clamp 22, the spindle motor 23, the actuator 25, the permanent magnet 29, the upper yoke 30, the lower yoke 31, and the ramp 38 are arranged in the shielding structure.

34 denotes a PCB and this is provided with ICs 35 for controlling recording and reproduction of information and positioning of the actuator and an interface connector 36 into and from which information is input and output by a computer and the like. In addition thereto, the PCB 34 is further provided with a resistance, a capacitor and the like, thereby forming an electric circuit. In addition, the PCB 34 has a shape on which two holes 34a and 34b for avoiding the spindle motor 23 and the ball bearing 29 mounted on the actuator have been made. This PCB 34 is arranged outside the shielded space. In addition, the PCB 34 is, as shown in the drawings, covered by a bottom cover 37.

The top cover 33 has a hat-like shape around which a brim 33a is provided and whose central portion is swollen. In addition, the top cover 33 has been formed to be smaller than the plane area of the frame body 24 and when the top cover 33 is attached to the frame body 24, the surface of the rim 33a of this top cover 33 and the surface of the frame body 24 are arranged on an identical plane and a gap 42 is created therebetween. The top sheet 39 is a feature of the present invention and has a hole 39a on its central portion and into this hole 39a, a swollen part 33b of the top cover 33 is inserted. Then, the top sheet 39 is adhered to the upper surface of the rim 33a of the hat shape and the frame body 24 by the adhesive portion 32 provided on this top sheet 39, thereby closing the gap 42, thus shielding the interior of the device.

When repairing the device, the top sheet 39 is removed and the top cover 33 is opened, then repair is performed. At this time, the top sheet 39 can be removed alone, the top cover 33 is not deformed. Then by replacing only the low-priced top sheet 39 and reusing the top cover 33, a rise in the price of the device can be suppressed. In addition, as shown in the drawings, in a condition where the hole 39a of the top sheet 39 is penetrated, a part of the top cover 33, the clamp 22, the actuator 25, and the upper yoke 30 can be arranged.

The size of a device based on the PCMCIA Type II standards, that is, the thickness thereof is 3.3 mm at the peripheral portion, which is thinner than 5 mm at the central part. Therefore, if a 1.8-inch magnetic disk is mounted on a device of this size, it is necessary to adhere a sheet on the thin peripheral portion. If the hole 39a is not made on the top sheet 39, it is necessary to construct the device within the part having a thickness of 3.3 mm, the mechanism portion cannot be largely secured, and performance of the device cannot be enhanced.

Since a device based on the PCMCIA Type II standards is thin with a thickness of 5 mm, it is important to efficiently arrange mechanical components and electric components. In recent years, due to technological progress, four ICs can constitute the ICs 35 for driving a magnetic hard disk drive. As a result, it becomes possible to mount the components constructing an electric circuit such as the ICs 35, a resistance, a capacitor and the like on one surface of the PCB even with the device size being based on the PCMCIA Type II standards. Nevertheless, if the PCB 34 can be arranged only within the part having a thickness of 3.3 mm, the ICs 35 can be mounted only on one surface of the PCB 34, that is on the opposite side of the frame body 24. Even if gaps between the ICs 35 exist, mechanical components cannot be arranged therein. It is preferable that the mounting surface for the ICs 35 on the PCB 34 is provided on the frame body 24 side.

Figure 1:
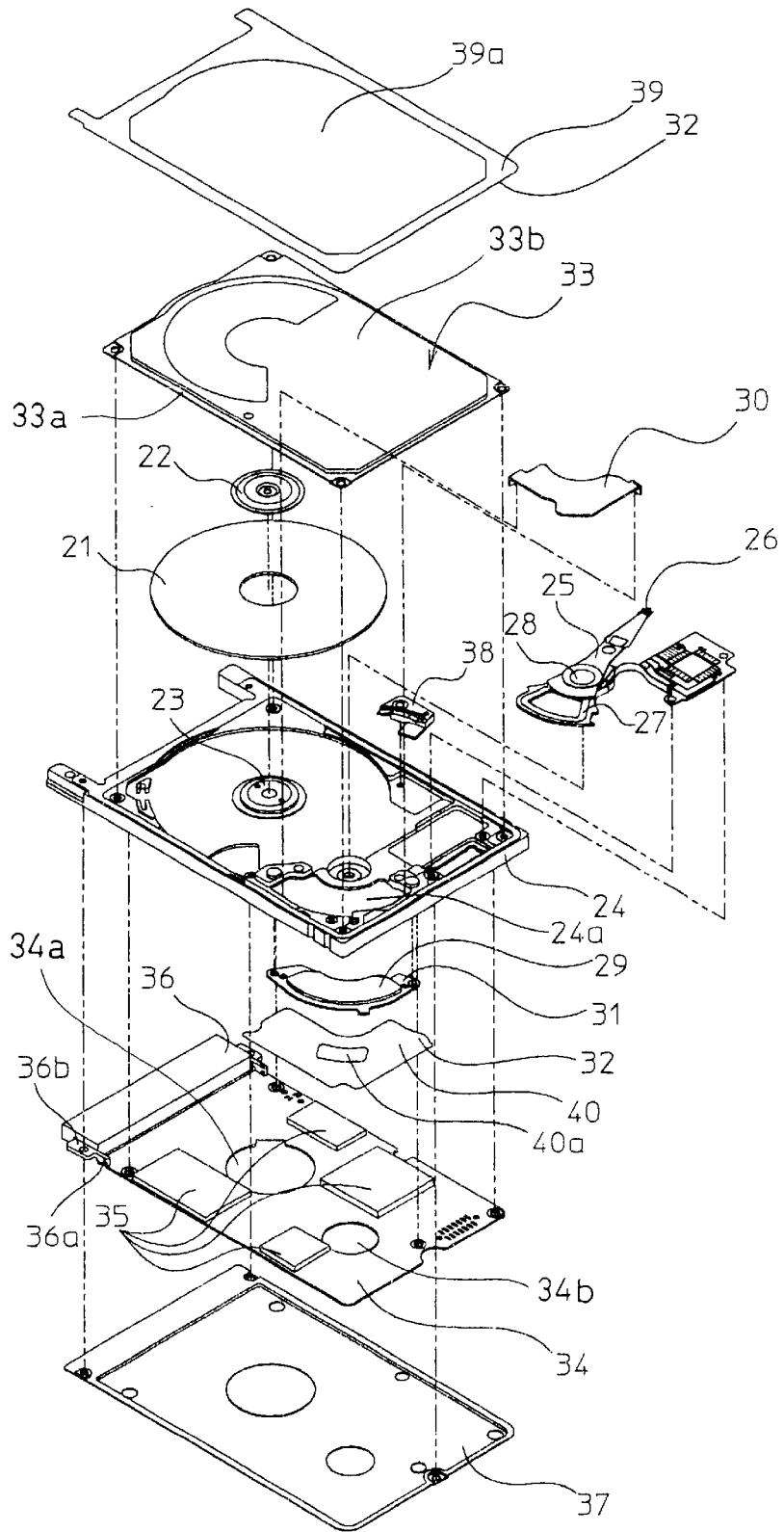
FIG. 1 is an exploded perspective view showing a disk device according to an embodiment of the present invention.
Figure 2:
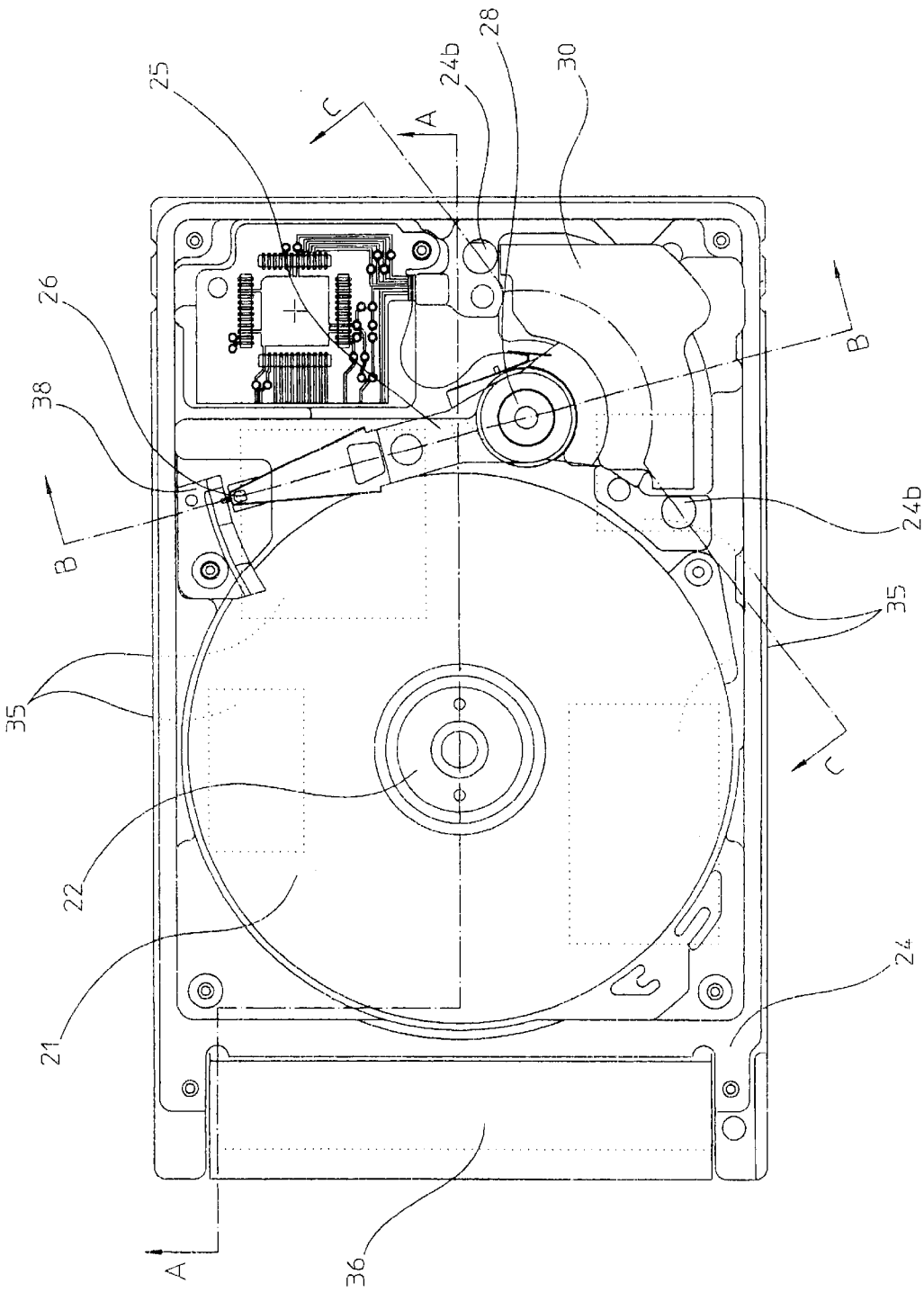
FIG. 2 is a plan view of the disk device in FIG. 1.
Figure 3:
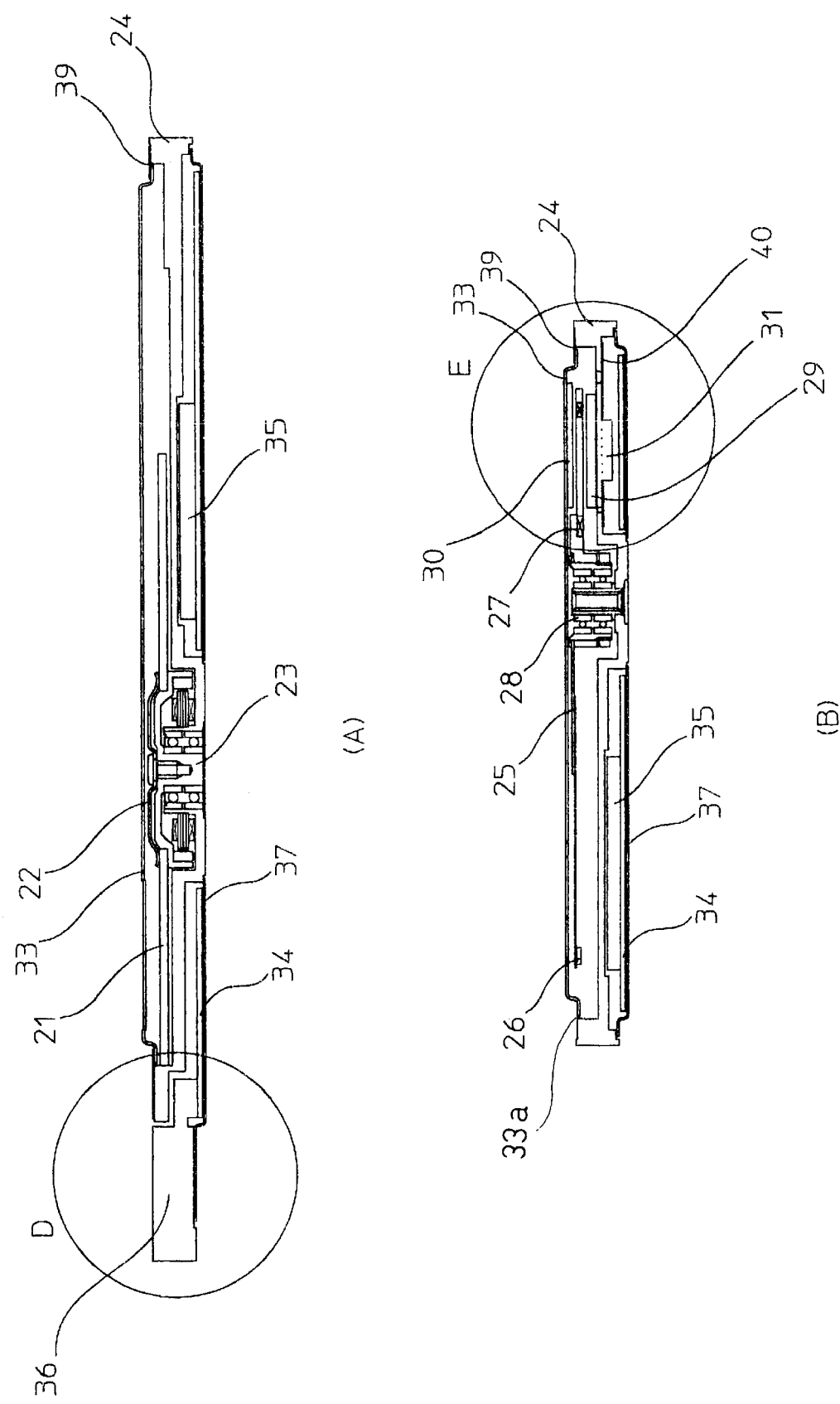
FIG. 3 shows sections of the disk device in FIG. 2.
Figure 4:
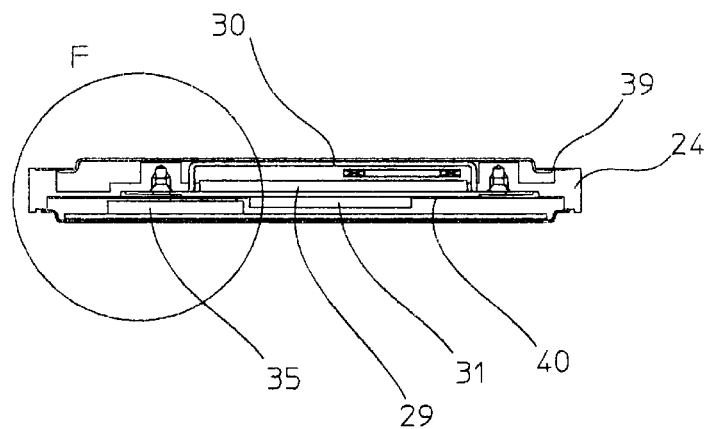
FIG. 4 is a section of the disk device in FIG. 2.
Figure 5:
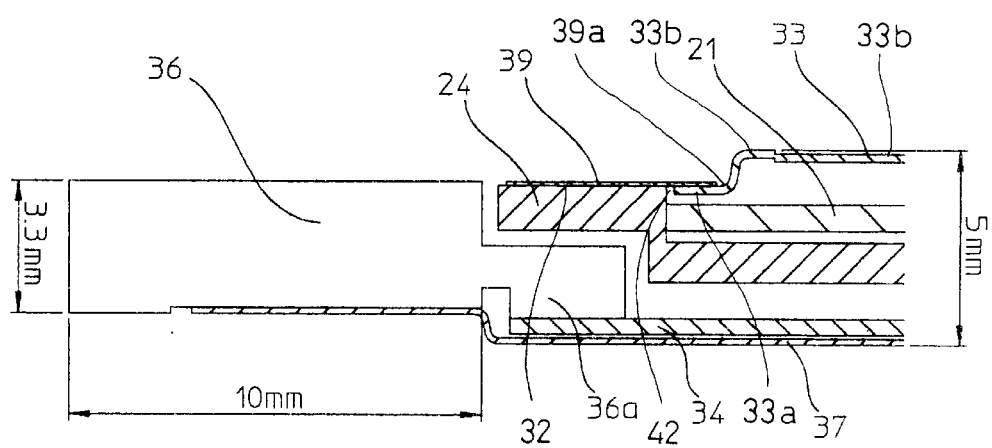
FIG. 5 is an enlarged view of part D in FIG. 3(A)
Figure 6:
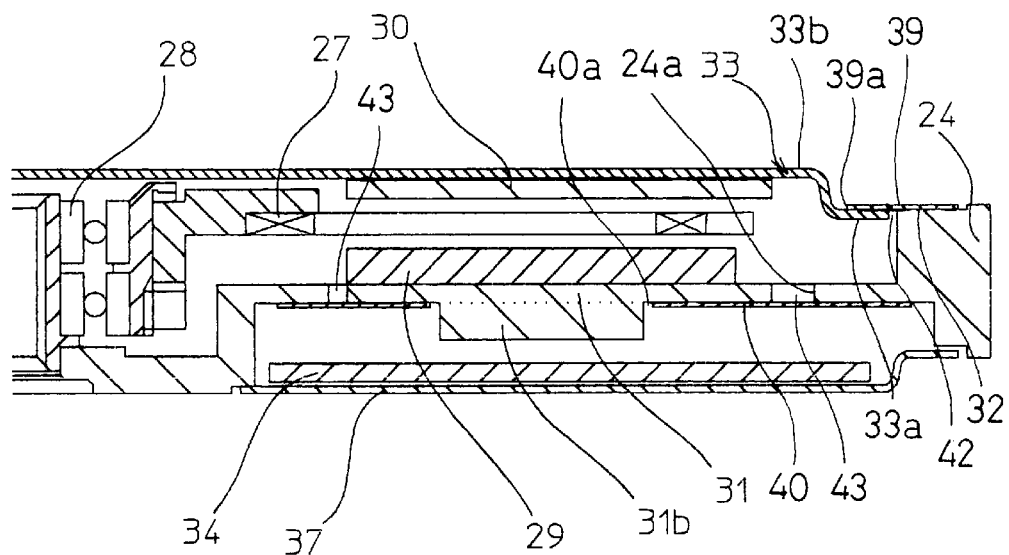
FIG. 6 is an enlarged view of part E in FIG. 3(B)

Therefore, in the present invention, the interface 36 has a part exceeding a Part having a length 10 mm, which is the original arranging position, and is provided with, on both end portions of the interface connector 36 of this part, as shown in FIG. 1 and FIG. 5, horns 36a which enter the part having a thickness 5 mm, and by these horns 36a, it is made possible to arrange the PCB 34 on a part on the side lower than the part having a thickness of 3.3 mm along the thickness direction. As a result, it becomes possible to set the mounting surface for the ICs 35 of the PCB 34 as only one surface on the frame body 24 side and arrange mechanical components between the ICs 35.

Thus, even when employing the ramp loading method which has been employed in recent years for an improvement in impact resistance of the device, higher recording density of information, and lower power consumption, the voice coil motor can be made thick, thus making it possible to cause the actuator 25 to generate sufficient torque.

In the interface connector 36, the connecting part to the PCB 34 can be made only into a form of the slender horns 36a due to the dimensions and the rigidity is low. Therefore, the interface connector 36 is fixed, by providing connecting portions 36b for being fixed on the frame body 24 by screws on both end portions of this interface connector 36, on the frame body 24 by screws by using these connecting portions 36b. As a result, even if an impact is applied to the interface connector 36, the electrically connecting part of this interface connector 36 is prevented from being detached.

As shown in the drawings, a hole 24a in which the permanent magnet is fitted is formed on the frame body 24 and the lower yoke 31 is fixed on the frame body 24 by screws from the rear side of this frame body 24. By making the hole 24a on the frame body 24 as such and providing the lower yoke 31 in place of the lower surface wall portion of the frame body 24, the magnetic circuit portion can be thickly formed and torque which is generated by the actuator 25 can be made great. In addition, by providing bosses 24b having screwing margins inside the frame body 24 and attaching the lower yoke 31 from the rear side of the frame body 24 by utilizing these bosses 24b with screwing margins, screwing can be carried out without reducing the mounting area for the ICs 35 of the PCB 34.

If the lower yoke 31 is screwed from the front side of the frame body 24, it is necessary to provide screwing margins on the lower portion of the frame body. However, the bottom surface of the frame body 24 is very thin, in such a case, it becomes necessary to provide bosses on the side lower than the lower portion of the frame body 24. Therefore, by these bosses on the lower side, the mounting area for the ICs 35 of the PCB 34 is reduced.

In addition, according to the above-described construction, the lower yoke 31 is fixed by screws, therefore if need for replacing this lower yoke 31 arises, the lower yoke 31 can be replaced alone by removing these screws, without replacing the frame 24 or the spindle motor 23. In addition, since the lower yoke 31 is attached from the rear side of the frame body 24, there is also an advantage such that without detaching the actuator 25, the lower yoke 31 can be replaced alone.

Figure 7:
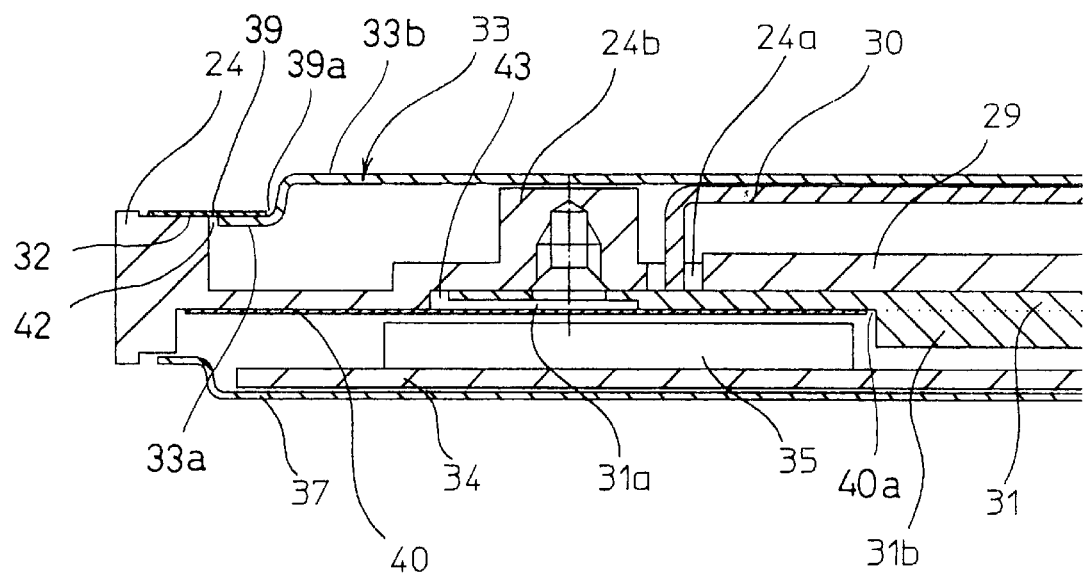
FIG. 7 is an enlarged view of part F in FIG. 4.
Figure 8:
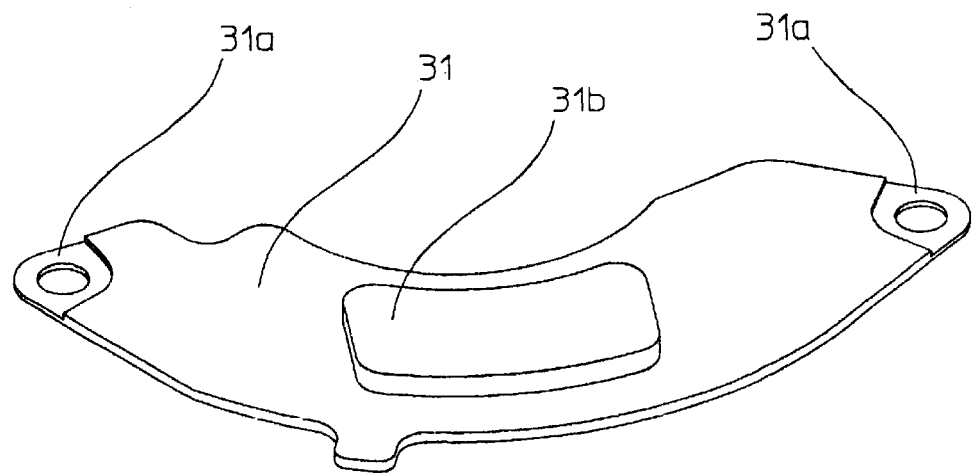
FIG. 8 is a perspective view of a lower yoke in FIG. 1 as viewed from a PCB side.
Figure 9:
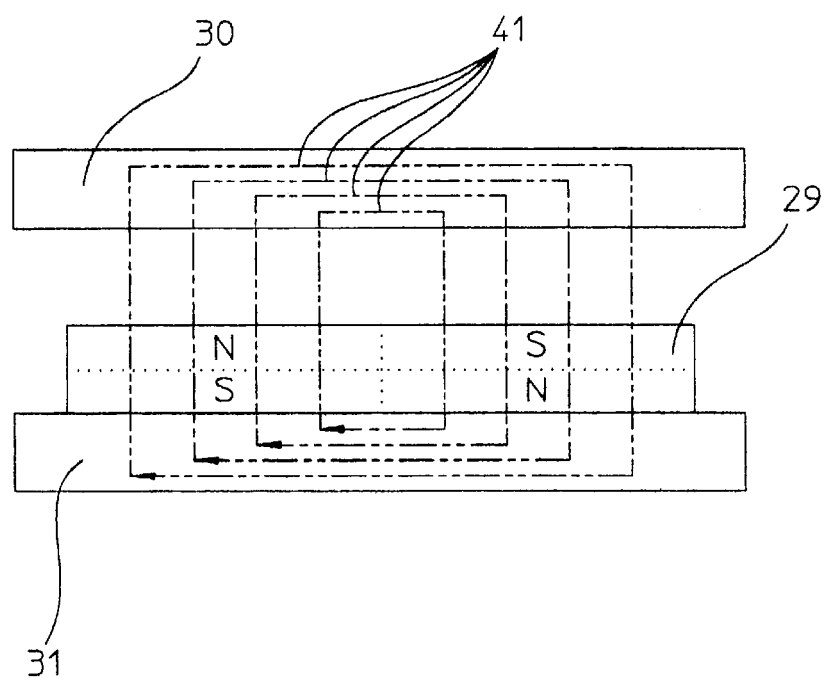
FIG. 9 is a schematic view showing a flow of magnetic fluxes in a magnetic circuit in the disk device of FIG. 1.
Figure 10:
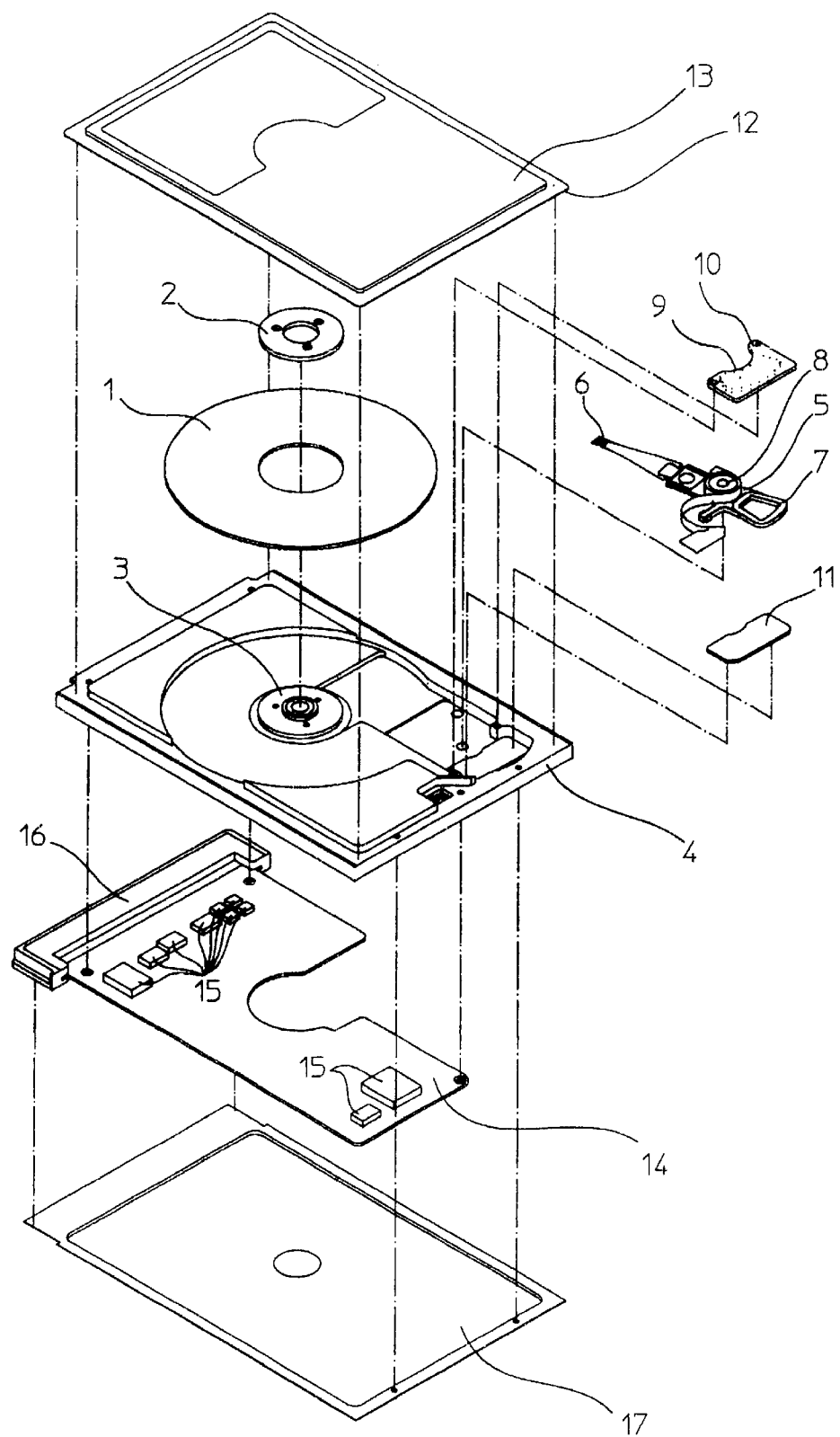
FIG. 10 is an exploded perspective view of a prior disk device.
Figure 11:
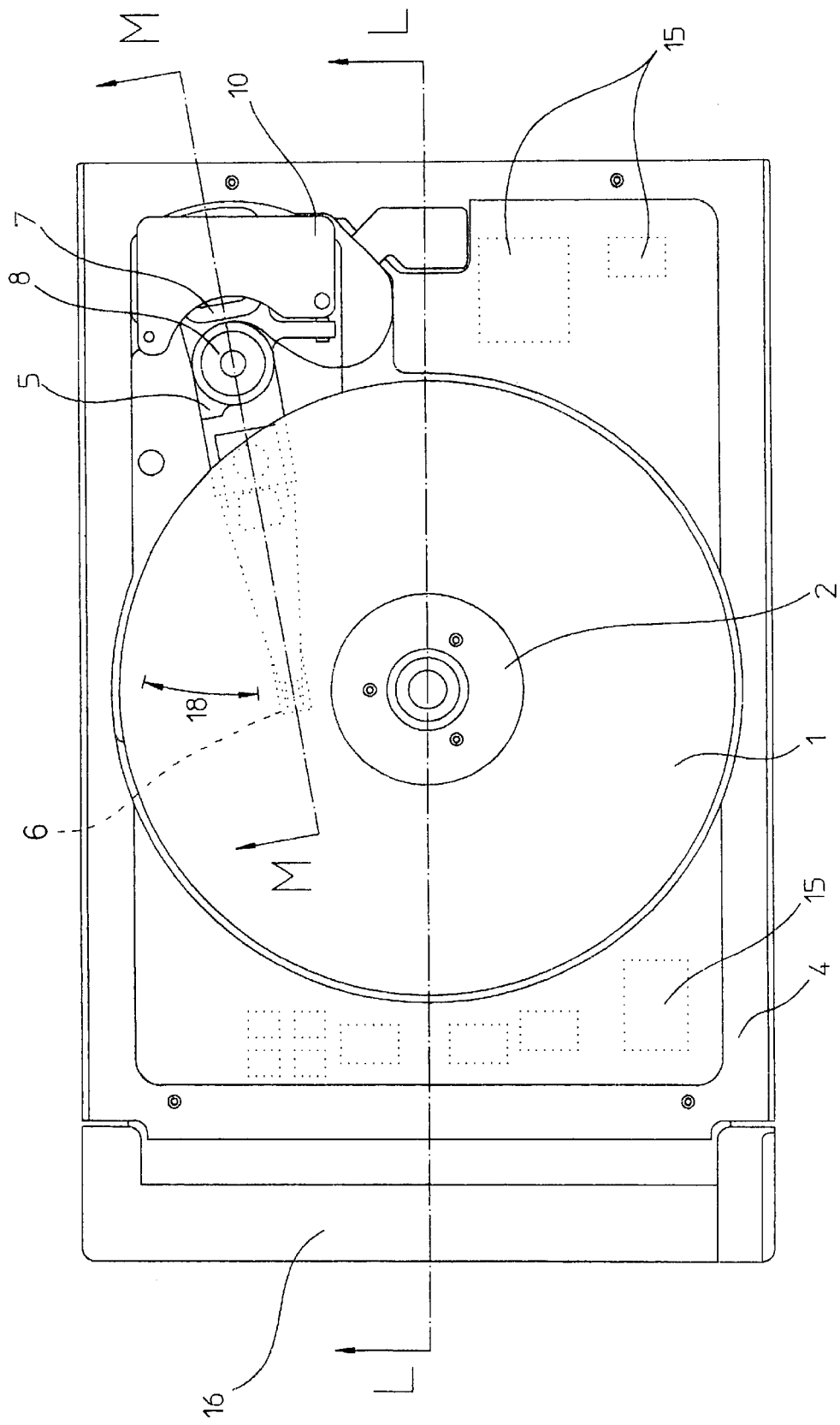
FIG. 11 is a plan view of the disk device in FIG. 10.
Figure 12:
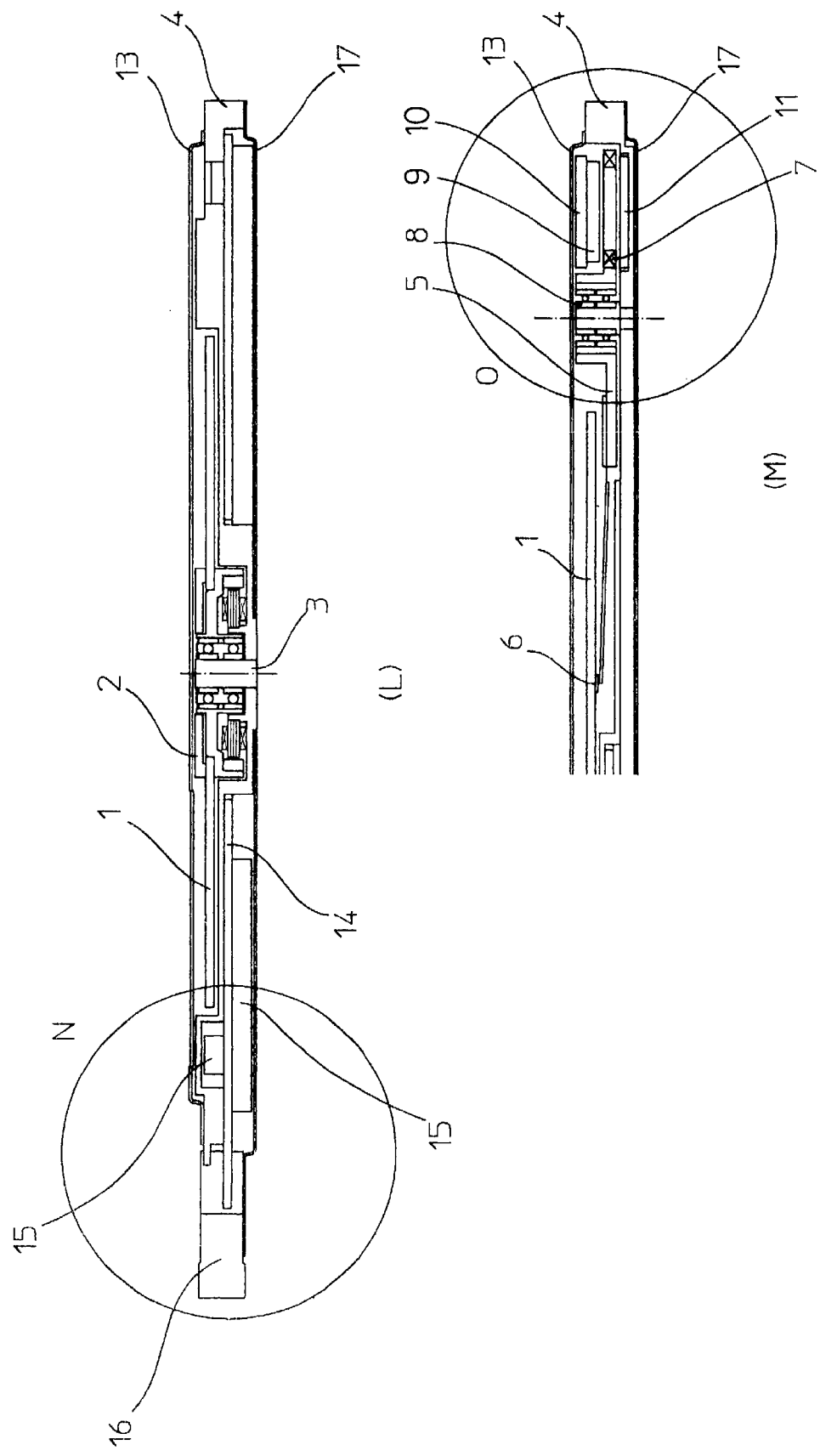
FIG. 12 is a section of the disk device in FIG. 11.
Figure 13:
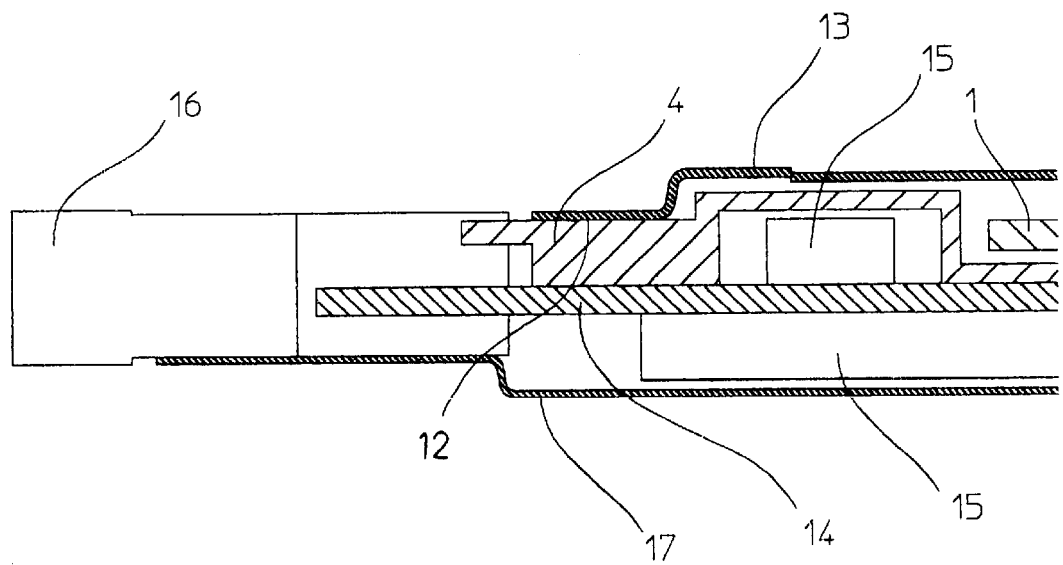
FIG. 13 is an enlarged view of part N in FIG. 12.
Figure 14:
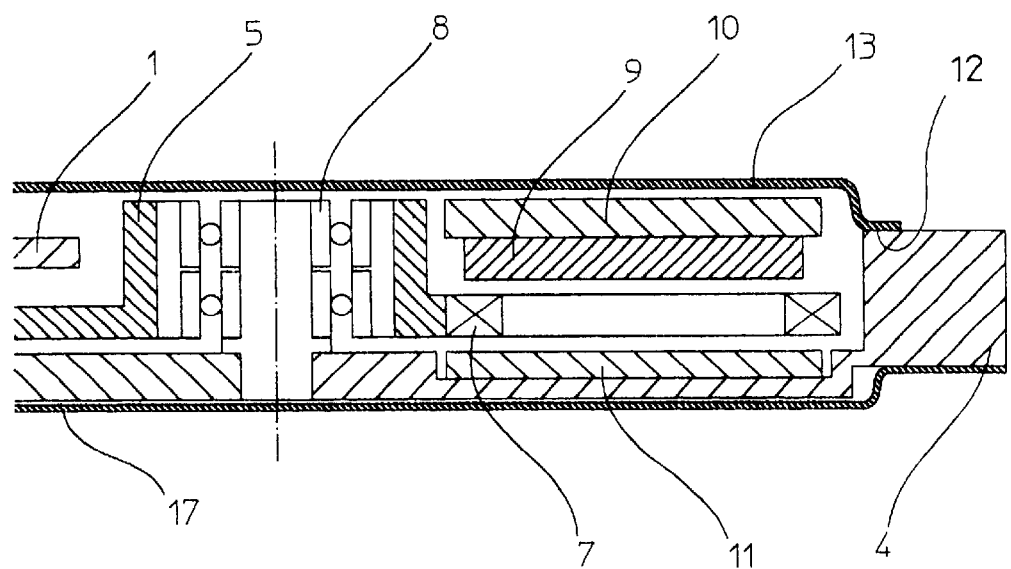
FIG. 14 is an enlarged view of part O in FIG. 12.

FIG. 8 shows a view of the lower yoke 31 viewed from the PCB 34 side. This lower yoke 31 has concave portions 31a where screw heads are embedded. As a result, the screw heads do not become lower than the lower surface of the lower yoke 31 and as shown in FIG. 7, the ICs 35 can be mounted on the PCB 34 on the lower side of the screw heads. In addition, the lower yoke 31 is thick between the N-pole and S-pole of the permanent magnet and in the vicinity thereof and is thin in thickness on the other part. FIG. 9 shows the flow of magnetic fluxes inside the magnetic circuit. As illustrated, the closer to the middle between the N-pole and S-pole of the permanent magnet (the central part of the magnet), the more the magnetic fluxes 41 flow. Therefore, the thickness of the lower yoke 31 need not be uniform and may be thin at a part other than the central portion of the magnet. In the present invention, the lower yoke 31 is thin at a part other than a part 31b which corresponds to the central portion of the permanent magnet 29, therefore, for example, as shown in FIG. 7, the ICs 35 may be mounted on the PCB 34 on the lower side compared thereto. It does not matter whether the lower yoke 31 is constructed by a single component or a plurality of components. Namely, the part 31b of the lower yoke 31 which corresponds to the central portion of the permanent magnet 29 may be constructed separately from the other part and attached to the other part. As a result, it becomes possible to cause the actuator 25 to generate great torque without reducing the mounting area for ICs 35.

In the device of the present invention, the hole 24*a* is provided on the lower surface of the frame body 24, and as described in the foregoing, the interior of the device must be of a shielding structure. Therefore, the gap 43 between the lower surface of the frame body 24 and the lower yoke 31 is shielded by the bottom sheet 40 having an adhesive portion. A hole 40*a* is made on the central portion of this bottom sheet 40. Into this hole 40*a*, the central thick part 31*b* of the lower yoke 31, which has been described in the foregoing, is inserted. As a result, while employing the shielding structure, without reducing the area for mounting the ICs 35, it becomes possible to cause the actuator 25 to generate great torque.

As above, in the disk device of the present invention, it is possible to efficiently arrange the mechanical portion and the electric circuit part, thus making it possible to improve the torque of the voice coil motor and employ the ramp loading method for impact resistance, higher recording density of information, and lower power consumption.

What is claimed is:

1. A disk drive compliant with PCMCIA Type II standards, comprising:

top and bottom covers that define a central volume;

a disk drive mechanism in said central volume;

a printed circuit board in said central volume;

said central volume comprising a disk drive mechanism region having a first thickness that houses said drive mechanism, and a printed circuit board region outside said disk drive mechanism region and having a second thickness that houses said circuit board;

a peripheral region outside said central volume, said peripheral region having a thickness thinner than the entire thickness of the central volume; and an interface connector in said peripheral region comprising horn-shaped connecting portions, said interface connector for making electrical connections external to said central volume, and electrically connected to said printed circuit board by said horn-shaped connecting portions, and said printed circuit board region is located outside a part of said central volume having boundaries in a thickness direction corresponding to and in alignment with boundaries in a thickness direction of the peripheral region.

2. The disk drive as set forth in claim 1, further comprising a frame body located within said central volume wherein the interface connector is attached to said frame body.

3. The disk drive as set forth in claim 1, further comprising a frame body having a frame body side, wherein a surface of the printed circuit board for mounting electric components thereon is a surface adjacent the frame body side.

4. The disk drive as set forth in claim 1, wherein said disk drive is a magnetic hard disk drive.

* * * * *